United States Patent Office 3,284,369
Patented Nov. 8, 1966

3,284,369
SILICA SUPPORTED CATALYSTS AND METHOD OF PREPARATION THEREOF
Horacio E. Bergna, West Park, Wilmington, Del., and Frank A. Simko, Jr., Cedar Grove, N.J., assignors to E. I. du Pont de Nemours and Company, Wilmington, Del., a corporation of Delaware
No Drawing. Filed Aug. 12, 1965, Ser. No. 479,278
6 Claims. (Cl. 252—454)

This application is a continuation-in-part of our copending application S.N. 337,534, filed January 14, 1964 and now abandoned, which is in turn a continuation-in-part of application S.N. 68,338 filed November 10, 1960, also now abandoned.

This invention relates to catalysts. More particularly it is directed to amorphous silica powders modified with a metal-containing constituent, to processes for making such powders by drying silica sols containing said modifiers, to a process for making metal-modified amorphous silica catalysts by molding the metal-modified amorphous silica powders, and to the uniformly porous and uniformly metal-modified catalysts so produced.

More particularly the invention is directed to powders comprising amorphous silica in the form of powdered aggregates of ultimate particles, the aggregates having a coalescence factor of less than 30%, being substantially free of non-volatile constituents other than silica, and having a bulk density greater than 0.2 gram per cubic centimeter, and the ultimate particles being spheroidal and substantially uniform in size as observed by electron microscopy, being non-porous and having an average diameter of from 5 to 200 millimicrons, and a metal-containing constituent of the group consisting of metals, metal oxides and compounds which decompose to metal oxides on heating to 1000° C. in air, the metal in said constituent being present in the amount of from .01 to 5% by volume, based on the silica, the metal-containing constituent being dispersed substantially homogeneously in the powder composition.

The invention is further particularly directed to processes for making the above-described powders, the processes comprising the steps of making a silica sol which is substantially free of non-volatile constituents other than silica and in which the silica is amorphous and in the form of non-porous, substantially uniform-sized, discrete ultimate particles having an average size in the range of 5 to 200 millimicrons, dispersing the metal-containing constituent in said sol, and drying the sol before any substantial silica coalescence occurs therein and at a rate which is substantially instantaneous after the silica concentration in the continuous liquid sol phase approaches about 50% by weight.

The invention is still further particularly directed to processes for making metal-modified amorphous silica catalysts, said processes comprising preparing a metal-modified silica powder as above described, compacting the powder under pressure to a uniform density of from 1 to 2 grams $SiO_2$ per cubic centimeter to form a compact containing between the ultimate particles, voids which are of substantially uniform size, and heating the compact at a temperature of up to 1000° C. until volatile and pyrolyzable constituents are removed and a uniformly porous, strong amorphous silica compact is obtained.

The processes and compositions of this invention are concerned with amorphous silica, in contradistinction to crystalline silica, hereinafter sometimes referred to as cristobalite. Such terms as fused silica, vitreous silica, and vitrified silica, have often been used interchangeably to describe amorphous silica bodies. The presence of crystallinity in a silica body is readily ascertainable by such standard techniques as studying an X-ray diffraction pattern of the silica body.

By this invention metal-modified silica-based catalysts are produced in such a way that the metal-modified, spheroidal, silica particles of uniform size become closely packed, thus having a porosity in the interstices which is of a uniform size and distribution throughout the catalyst body. A further advantage of the catalysts of this invention is that the pores, being between particles which are already closely packed, resist further collapse when the catalysts are subjected to the elevated temperatures required in catalytic reactions.

According to the present invention the surface of the silica is uniformly modified by selected metals. The metal is evenly distributed over the surface of the ultimate silica particles. The manner of modification, however, is highly important in that the metal-containing modifier is introduced into a dispersion of amorphous silica in a manner such that it becomes uniformly and intimately dispersed with respect to said silica, the dispersion converted to a powder without separation of said components, and the powder compressed to form the metal-modified, amorphous silica catalyst.

The metal-modified, amorphous silica powders are novel starting materials for making catalysts. In them, the amorphous silica is present in the form of non-porous, ultimate particles in the size range of 5 to 200 millimicrons these ultimates being jointed together into aggregates which by reason of their methods of preparation are lightly coalesced, and the metal modifier is present in the proportion of from .01 to 5% by volume, based on the silica, and is uniformly dispersed. The powders lend themselves to compaction to such a degree that catalysts made therefrom are particularly unique because of the porous form they obtain as hereafter described.

The small size and absence of substantial coalescence between ultimate particles are both important requisites for the metal-modified amorphous silica to have for making the catalysts of this invention. To successfully convert metal-modified silica powders to uniformly porous amorphous silica catalysts, the ultimates must be compacted in such a manner as to avoid a substantial number of large pores. If ultimate particles less than 200 millimicrons in diameter are loosely joined, that is, having coalescence factors less than 30%, as with the products of this invention, they can be compressed into catalysts having uniform distribution of pores which are of the same general size as the ultimates themselves. If, on the other hand, coalescence is high, bonds between the ultimates are difficult to break and compacts prepared therefrom contain large, non-uniform voids which are impossible to remove unless temperatures in excess of the crystallization point are employed.

It is also important that the powders do not contain excessive amounts of non-volatile impurities which can cause crystallization at catalytic reaction temperatures.

The effect which the metals and compounds of metals have on the crystallization rate of the silica is not sufficiently pronounced to preclude their use under the conditions of the present invention. Desirable results are achieved by having the metal modifier present in a highly dispersed state so that upon densification of the powder the modifier is not concentrated into large crystals which would be objectionable. Furthermore, by reason of the highly dispersed condition of the metal modifier, the proportion of it which must be used is confined to a minimum, which is economically advantageous.

MAKING THE METAL-MODIFIED AMORPHOUS SILICA POWDERS

To make a metal-modified, amorphous silica powder according to a process of the present invention, one must introduce the metal modifier in a manner which insures that it is highly dispersed. To do this, one first prepares a suitable silica sol and then dries the sol under certain critical conditions with the metal-modifying agent dispersed therein to obtain catalysts having the desired properties. The sols which are suitable as starting materials and the conditions which are critical in the drying step will now be described in greater detail.

The starting sol must first of all be a dispersion of amorphous silica ultimate particles. Since the silica in the ultimate product is to be amorphous it is highly important that the silica particles in the starting sol be free of crystallinity. Methods for determining the presence of crystallinity by X-ray techniques are discussed in R. B. Sosman's "The Properties of Silica," Chemical Catalog Company, Inc., New York, 1927, page 207.

The ultimate silica particles in the sol must be discrete and non-porous. The fact of whether or not they are discrete can be readily observed by examination of an electron micrograph. The fact of whether or not they are non-porous can be determined by comparing the surface area of the particles as calculated from the size determined in an electron micrograph with the surface area as determined from nitrogen adsorption measurements. If the latter is not more than 20% greater than the former, the particles can be considered to be dense, whereas a variation substantially greater than this would indicate that the ultimate particles contain pores or surface irregularities too small to be observed on the electron micrographs.

The ultimate silica particles in the sol must be discrete, rather than aggregated. The greater the aggregation of the particles, the greater the chance for development of macroscopic holes in the compacted catalysts, thus leading to heterogeneous porosity. A method for measuring the degree of aggregation of the ultimate particles in the sol is described in U.S. Patent 2,750,345, issued June 12, 1956, to Guy B. Alexander, at column 7, lines 11 to 55. This test provides a method for determining the percent solids in the dispersed phase of a silica sol (percent S). The greater the aggregation, the lower the percent S. The sols used in this invention should have a percent S greater than 55.

Also as observed by electron microscopy the ultimate silica particles in the sol should be uniformly-sized and spheroidal. By "uniformly-sized" is meant that 75% of the total number of particles have a diameter in the range from .5D to 2D, where D is the number average particle diameter. The uniform size of the particles is important in obtaining uniform voids in the formed catalysts. The uniformity of the particles can be determined by methods described in the Journal of Physical Chemistry, 57 (1953), page 932.

The size of the ultimate silica particles in the sol can also be determined by methods described in the Journal article just mentioned. The average particle size should be in the range of 5 to 200 millimicrons, preferably between 7 and 200 millimicrons and more preferably between 13 and 110 millimicrons.

Sols containing silica particles smaller than 5 millimicrons, such as those obtained by neutralizing sodium silicate with sulfuric acid, for instance, are not satisfactory because the particles tend to aggregate very rapidly and irreversibly. When such sols are freed of stabilizing ions they show rapid increase in viscosity and tend to gel in extremely short times. Accordingly, sols containing ultimate silica particles larger than 5 millimicrons in average diameter are used.

The continuous liquid phase of the silica sol is preferably water—that is, the sols are aquasols. Although organosols can be used, ordinarily any advantages to be gained from the use of an organosol are more than offset by the added cost.

The art is already familiar with methods for making silica aquasols of discrete, dense amorphous silica particles in the size range above specified, and any of these methods may be used to make the starting material employed in processes of the present invention. A particularly preferred type of silica aquasol is described in United States Patent 2,574,902, issued November 13, 1951, to Bechtold and Snyder. This patent describes how the size of the ultimate silica particles is increased into the desired size range by adding quantities of a low molecular weight silica feed sol to a heel sol containing particles which have been grown substantially. To minimize the amount of alkali contained in the silica particles it is preferred to use ammonium hydroxide as the stabilizing alkali used to adjust the ratio as described in the patent.

Regardless of its method of preparation, a silica sol to be useful as a starting material in the processes of this invention should be free of alkali and alkaline earth metals. These, if present, can be removed by deionizing the silica with a mixture of anion and cation exchange resins in accordance with processes described in United States Patent 2,577,485, issued December 4, 1951, to J. M. Rule. The sol is preferred temporarily stabilized against gelling or aggregation of the ultimate spheroidal particles by adjusting the pH to between 8 and 9 with a volatile base such as ammonia.

Alternatively, the sol can be purified by such methods as dialysis and other similar methods known to those skilled in the art.

Generally speaking, the total content of potassium, sodium and calcium oxides, for example, in the powder should not exceed about 0.1%. The exact level depends to some extent upon whether these impurities are on the surface of the particles or are locked within the silica structure. Thus, a few hundredths of a percent of combined sodium within the particles is not as harmful as this amount of combined sodium on the surface of the particle.

The metal-modifying agents used with the amorphous silica in the composition and processes of this invention can be metals, metal oxides, or compounds of metals which decompose to metal oxides upon heating in air to 1000° C. Thus it is seen that the modifying agents can be any of the numerous metals and metal compounds which are used for catalytic purposes. These can include such metals as copper, cadmium, manganese, calcium, magnesium, zinc, chromium, aluminum, molybdenum, tungsten, canadium, cerium, mercury, barium, tin, lead, bismuth, thallium, iron, cobalt, and nickel; as their salts such as nitrate, formate, acetate, chloride, sulfate and the like. These metals can also be used as their oxides. Also they can include precious metals such as platinum, palladium, rhodium, ruthenium, iridium and osmium in their elemental forms or as their salts.

The proportion of metal added should be from about 0.01 to 5% by volume, based on the silica. It will be understood that this proportion is the total amount of modifying metal present but that more than a single metal can be used to attain this proportion. In such instances there can be found in the final supported catalysts of this invention, mixed oxides of the metals, compounds of two or more of the metals present with each other such as chromites, manganites, molybdates, tungstates, vanadates, cerates, stannates and ferrites.

One of the advantages of starting with a silica sol is that when such colloidal solutions are dried, the surface of the silica particles becomes coated with the metal or metal oxide or their soluble precursors, in molecular dimensions, and little, if any, excess metal modifier will be present in locations other than on said particle surfaces. Thus, the metal modifier is located in such a manner as to exert its maximum influence on catalytic activities and harmful excesses are not concentrated in isolated areas.

The metal modifier is prefably introduced into the silica sol as a dispersion in a liquid medium. It will be understood that the term "dispersion" includes either a true solution or a colloidal suspension. A particularly preferred method is to add to the silica sol an aqueous solution of a compound of the metal, such as a salt, while mixing with sufficient vigor to effect homogeneity substantially instantaneously, and remove the liquid phase of the resulting dispersion under conditions which minimize any segregation of the modifier and silica, as hereinafter more particularly described.

If the modifying agent is in the form of the elemental metal or the metal oxide, hydrous oxide, hydroxide, or other insoluble compound, no problem of coagulation of the silica particles will ordinarily be encountered when it is added to the sol. However, if the metal modifier is in the form of a soluble salt, it it usually desirable to introduce it into the silica sol immediately before the drying step so that the extent to which it can promote coalescence of the silica is minimized. Since the proportion of metal compound is generally quite small the coalescence effect in any event is not very pronounced.

Having prepared a suitable amorphous silica starting sol and added the metal modifier as above described, the sol is dried to a powder at a rate which is substantially instantaneous after the silica concentration in the continuous liquid sol phase approaches about 50%. After the sol has been deionized, and sometimes after salts of the modifying metal have been added, the sol is in a metastable state and has a pronounced tendency to gel. This tendency is marked, in its incipient stages, by an increase in the viscosity of the sol, the increase being due to the individual ultimate silica particles coalescing into aggregates. Coalesced aggregates are not easily broken down when subjected to compaction, and as a result the large voids which are inherent in the compact persist into the catalysts. By quickly drying the sol this tendency is minimized and excessive aggregation is avoided.

Whatever the method used for drying the sol, it should be one which completes the drying very rapidly—that is, practically instantaneously—after the concentration of silica has started to rise. Thus, a batch drying operation wherein the sol is run into trays and water gradually evaporated off is completely unsuitable. When the concentration of silica in the liquid phase approaches about 50%, the rate of aggregation of the ultimate silica particles is very rapid and the coalescence factor of products thus obtained is above the permissible limit.

Spray-drying is a preferred method for drying the sol provided the operation is conducted within the limits above mentioned. Once these limits are recognized, those skilled in the art of spray-drying will have no difficulty setting up the drying operation to accomplish the desired result.

The most important factors in this spray-drying operation are (a) the fineness of the spray droplets, which will in turn control the size of the silica aggregates in the powder, (b) the concentration of silica in the sol being sprayed, it generally being desired to keep the silica concentration below the point where the viscosity will interfere with the production of very fine spray droplets, (c) the temperature of the drying air, and (d) the removal of physically adsorbed water from the dried aggregate particles at relatively low temperature. Generally speaking, the conditions employed in conventional spray-drying equipment will be found satisfactory, providing the powder product is removed from the heated zone as rapidly as it is dried so as to minimize coalescence of the ultimate spheroidal particles within the aggregates.

Freeze-drying is another method of converting a silica sol to a dry powder with minimum coalescence of the ultimate amorphous silica particles. In this method the sol is cooled to a low temperature and then frozen very fast as a thin film; thereafter the frozen water is sublimed. The process is less preferred than spray-drying because it produces aggregates in the form of relatively large platelets many microns in diameter and several microns in thickness, this peculiar shape being the result of the concentration and aggregation of the ultimate spheroidal particles between the ice crystals at the moment of freezing. Such a powder may be further pulverized, preferably by a procedure which will not compact the silica structure, such as in a micronizer or gas jet compact mill.

Drum-drying the sol is the least preferred procedure but can be used under suitable circumstances. In this method a thin film is applied to the surface of a rotating, heated drum and the dried residue is continuously removed as the drum rotates. This drying process is particularly applicable when the amorphous silica ultimate particles are larger than about 50 millimicrons in average diameter, since these larger particles have a smaller tendency to coalesce and coalescence is the principal problem encountered in drum-drying. Since rapid and complete removal of free water from the silica aggregates at the lowest possible temperature is essential, a vacuum drum-drier which will evaporate the water at a temperature not much higher than ordinary room temperature gives the best results. The particular drying procedure to be employed will be selected principally in view of the size of the ultimate spheroidal silica particles involved. Thus, for particles larger than, say, 50 millimicrons in diameter, various methods of drying can be employed. For drying sols in which the particles are smaller than about 50 millimicrons in diameter, the conditions are more critical and the method must be selected with a view to considerations herein more fully described. Spray-drying can be employed with all sizes of spheroidal colloidal silica particles with which this invention is concerned.

The choice of spray-drying conditions employed becomes very important in the case of ultimate silica particles smaller than 20 millimicrons in diameter, and are highly critical for particles in the range from 5 to 10 millimicrons in diameter. In the latter case one employs a sol thoroughly purified from non-volatile, ionic contaminants and the pH is in the range of 2 to 4 or 8 to 9, the lower range being obtained by acidification with a volatile acid and the upper range being obtained by adjustment with ammonium hydroxide. Also, the spray droplets must exceedingly fine to permit as nearly instantaneous drying as possible and the resulting powder must be removed from the heated zone as rapidly as possible.

The substantially spheroidal silica powder particles obtained by spray-drying a sol can readily pack together with a minimum of voids. On the other hand, the aggregates obtained by freeze-drying and drum-drying the sol are not as easy to pack together because of their irregular shape and thus are not preferred. However, even in this latter instance the irregularly shaped aggregates can be more readily packed together with minimum voids by having an organic lubricant present in the sol when it is dried. Products dried with an organic lubricant present are found to compact more readily than when the lubricant is not used.

Even when an organic lubricant is used in conventional manner, the force required to compact a freeze-dried or drum-dried powder is in the range of about 5 to 10 tons per square inch. The organic lubricant appears to aid in maintaining the particles in coherent shapes of the desired degree of packing after the molding force is released. The elasticity of the silica aggregates might disturb the compacted arrangement after the force is released, if the lubricant did not prevent it.

The product obtained by drying the metal-modified silica sol as above described, whether spray-dried or dried with an organic lubricant by freeze-drying or drum-drying is a powder consisting of aggregates of loosely coalesced amorphous silica ultimate particles having the metal modifier homogeneously dispersed therethrough, as more fully described below.

CHARACTERISTICS OF THE METAL-MODIFIED AMORPHOUS SILICA POWDER

In the metal-modified amorphous silica powders of this invention three kinds of silica particles can be recognized. These are: (1) the smallest units discernible by the electron microscope, herein sometimes called "ultimate particles," consisting of amorphous silica and appearing in electron micrographs substantially as spheres, (2) aggregates made up of a multiplicity of the ultimate particles joined together in chains, rings, or three-dimensional networks by siloxane (Si–O–Si) bridges, and (3) powder particles of microscopic or macroscopic size, which can be made up of a multiplicity of the aggregates loosely bonded by secondary bonds such as hydrogen bridging or van der Waal's forces. The metal-modifying constituent is homogeneously dispersed throughout the powder. Prior to firing it does not appear to penetrate into the ultimate silica particles but is dispersed throughout the aggregates and throughout the powder particles.

The ultimate amorphous silica particles have an average size in the range of 5 to 200 millimicrons—that is, the ultimate particle size of the silica in the original sol persists through the drying step. The particle size can be easily observed in electron micrographs for ultimates larger than, say, 7 millimicrons; for ultimates smaller than this, the size can be calculated from specific surface area measurements.

The aggregates in the novel silica powders are made up of a number of ultimate particles lightly coalesced at their points of contact. In the spray-dried products the aggregates are generally smaller than about 10 microns.

The size of the powder particles in the metal-modified silica powders of this invention is not critical. As a matter of convenience powders which pass through a 50-mesh screen are preferred because they are readily adaptable to compacting operations to form the catalysts of this invention. If for any reason the products obtained by drying sols as above described are not sufficiently fine, they can be ground by conventional methods. Such grinding does not, of course, affect the size of the ultimate particles present.

The metal-modified, amorphous silica powders are free of crystalline silica, and the silica aggregates in them have a relatively low degree of coalescence. The latter is an extremely important characteristic in that it renders the powders suitable for the compaction step involved. There is thus a cooperation between the manner of drying the sol and the compacting step.

The degree of coalescence of the aggregates is expressed quantitatively in terms of the "coalescence factor." This coalescence factor is less than 30%. The coalescence factor is an indication of the extent to which the ultimate particles are joined together. In aggregates where the ultimate particles are so firmly joined together that they have substantial Si–O–Si linkages between the ultimates and cannot be compressed to compacts with small, uniform pores, the coalescence factor is considerably higher than 30%. The coalescence factor is well understood in the art and is described, for instance, in United States Patent 2,731,326, issued January 17, 1956, to Guy B. Alexander.

The degree of coalescence, or "coalescence factor," is determined according to the method given in the just-mentioned United States patent, at column 12, lines 25 and the following. The method involves measuring the percentage transmission of light through the silica-water dispersion, measured with light having a wave length of 400 millimicrons. This method is suitable for use with silica powders in which the average particle size of spheroidal amorphous silica particles is less than 50 millimicrons. If the silica particles are larger than this, light having a wave length of 700 millimicrons should be used.

The metal-modified amorphous silica powders have a packed bulk density of at least 0.2 gram per cubic centimeter. "Packed" density is measured by placing a weighed quantity of sample in a graduated cylinder, and tapping the cylinder until the volume is essentially constant.

MAKING CATALYSTS FROM THE METAL-MODIFIED, AMORPHOUS SILICA POWDERS

Catalysts of metal modified amorphous silica are made from the powders by compacting the powder under pressure. The powder may be evenly flowed into a steel mold or die and compacted with a plunger. Hydrostatic compaction around a mandrel in a rubber mold which is squeezed by hydrostatic pressure can be employed for making cylindrical, hollow objects. Powders can be roll-formed into sheets or bars or can be extruded through a die to form rods.

The molded catalysts can be further shaped by cutting or crushing either after the molding at room temperatures or after calcining at temperatures below 850° C. Usually the mechanical strength of the catalysts is greatly improved by baking at temperatures ranging from 400 to 800° C.

In the compaction step the pressure applied should be sufficient to produce a uniformly dense compact having a density of at least one gram per cubic centimeter after removal from the die. The density can be determined from the weight of the sample and its dimensions. For this purpose it is convenient to use a die in the shape of a rectangular parallelepiped.

The pressures involved in the compaction operation are in the order of from 1 to 15 tons per square inch (t.s.i.). At pressures lower than 1 t.s.i., the molding powder does not achieve a high enough formed density. The catalysts formed by the pressing operation have considerable dry strength and can easily be handled without damage.

If, in making the metal-modified silica powder, the metal modifier was added to the silica in the form of a compound which decomposes to a metal oxide on heating to elevated temperatures in air, such compound can be converted to the oxide by heating above the decomposition temperature either before or after the compaction operation.

If an organic lubricant was present in the metal-modified silica powder, it can be removed after the compaction step by volatilization or by burning it out in air. This is done by heating the formed catalyst to a temperature not exceeding the sintering temperature. Satisfactory results can be obtained by heating the formed catalyst slowly from room temperature to the range of 400 to 600° C. at a rate no faster than 50° C. per hour, preferably no faster than 25° C. per hour, and holding at the maximum temperature for two to six hours. Because the silica in the original powder was colloidal the catalysts at this point will have considerable strength because they have small voids at many points of contact of the silica, and hence can be easily handled.

The heating of the shaped catalyst is usually conducted in air, but it can be carried out in such reducing gases as hydrogen. In the latter case, some of the preferred metal modifiers are reduced to the corresponding metal. For example, if the metal modifier is a nickel compound such as nickel oxide, it is reduced to nickel metal.

THE POROUS, METAL-MODIFIED SILICA CATALYSTS

The porous, metal-modified, shaped silica catalysts obtained as above are novel and unique products. They consist essentially of the amorphous silica modified with the added metal. They have a density of from 1 to 2 grams per cubic centimeter. In these instances where the catalyst is in the form of irregular shaped pieces, the density of the individual pieces can be determined by the method of mercury displacement in an accurately calibrated pycnometer as described by M. Burr, Roczniki Chemie, 31, 293 (1957).

The catalysts are relatively strong and contain uniform-sized voids no larger than one micron in largest dimension. Moreover, 95% of the voids, or "pores" are no larger than 300 millimicrons in largest dimension. If the preferred silica dispersions are used, 95% of the pores are no larger than 200 millimicrons. If a sol containing 15 millimicron particles is used, 95% of the pores are no larger than 15 millimicrons.

The voids—that is, the open spaces between the ultimate particles—in the porous silica catalysts are substantially uniform in size. The pore volume and pore size distribution can be calculated from an analysis of gas adsorption-desorption isotherms. Small pores are filled at lower pressures and large pores at higher pressures. As the equilibrium pressure is increased in an adsorption experiment, condensation takes place in increasingly larger pores. Structure curves for solids may be drawn by plotting volume adsorption against the pore radius calculated from the relative pressure by means of the Kelvin equation. The pore size distribution curve is obtained by differentiating the structure plot. In catalysts prepared from the powders of this invention, no more than 5% of the total void volume is present in the form of pores having a size greater than twice the average pore size.

*Utility.*—The catalysts of the present invention can be used in the same ways as prior art catalysts containing the same active catalytic materials. Catalysts of the present invention are particularly valuable for the treatment of combustion gases emitted from gas-burning devices such as stoves, furnaces, refrigerators, clothes driers, and the like, and for treatment of the fumes from automobile exhaust and other internal combustion exhausts. The manganese chromite catalysts are particularly to be preferred for such uses.

The catalysts of this invention are also useful for catalyzing hydrogenation-dehydrogenation reactions and catalytic cracking of hydrocarbons in the same manner as prior art catalysts containing the same active catalytic materials are so used.

The products and processes of the present invention will be more readily understood and practiced by reference to the following illustrative examples.

*Example 1*

A 7-gram quantity of manganese metal as its nitrate salt is added slowly to 950 milliliters of water at 90° C. The mixture is stirred with a magnetic stirrer until all of the solid is dissolved. The solution is filtered while hot and then cooled and made up to a liter. The solution thus formed contains 7 grams of manganese per liter of water.

A 320-gram quantity of an ammonia-stabilized silica sol (30.9% silica) containing 15 millimicron silica particles prepared as described in United States Patent 2,574,902, issued November 12, 1951, to Bechtold and Snyder, is deionized with a sulfonic acid-type cationic resin in the hydrogen form and then with a polyamine-type anionic resin in the hydroxyl form. This cationic resin is filtered from the sol before the sol is treated with the anionic resin; the pH of the sol after double deionization is about 3.

The silica sol is charged to a Waring blender and while it is vigorously agitated, 135 milliliters of the manganese nitrate solution described above is added dropwise over a 15-minute period. The mixture is agitated for one hour after the addition of the manganese solution is completed.

At this point, 43 grams of a polyethylene glycol having an average molecular weight 3000 to 3700, dissolved in 43 milliliters of water, is added to the silica sol-manganese solution in the blender. The mixture is stirred for fifteen minutes in the blender.

The solution described above is transferred to a glass flask and frozen by rapidly swirling the flask in an acetone Dry Ice bath. The solution is agitated while being frozen, to prevent possible segregation of the manganese and silica. The flask is connected to a Hi-Vac Cenco pump and in this manner the frozen water is sublimed off and solids remaining are freeze dried. A dry, soft powder is obtained by the freeze-drying.

The powder described above is formed into bars by placing approximately 3 grams of it in a 2-inch by ¼-inch steel die and pressing in a hydraulic press to 10 tons per square inch pressure in about 3 minutes, holding the pressure for about one minute and releasing the pressure slowly. Bars, measuring 2 inch by ¼ inch by ¼ inch, having a high degree of green strength and which can be handled without damage are obtained.

The pressed bars described above are calcined in air at 750° C. until all of the manganese nitrate is converted to manganese oxide. They are then cooled and are ready for use as silica-supported catalysts either as is or the bars can be broken up by grinding or crushing into granular pellets, 100% of which pass through an 18 mesh sieve.

*Example 2*

A portion of the silica sol-manganese nitrate-polyethylene glycol solution described in Example 1 is diluted with 3 volumes of water and spray-dried in a spray dryer using two-fluid atomization. Dryers of this type are described in the "Chemical Engineer's Handbook" by John H. Perry, 3rd Edition, page 840. The inlet air temperature is 300° C. and the outlet air temperature is 110° C. The fine, dry powder that is collected in a cyclone separator is pressed into bars and calcined to form silica-supported catalysts as described in Example 1.

*Example 3*

A silica sol-manganese nitrate solution is prepared in a Waring blender, as described in Example 1. To this is added 43 grams of soluble starch. The mixture is stirred for fifteen minutes after the addition of the soluble starch. The solution is drum-dried by feeding it slowly to the nip of a double drum-dryer having 6-inch-diameter rolls. The roll clearance is 2 mils and the roll speed 2 r.p.m. The surface temperature of the rolls is 263° F. The dried powder is screened through a 50-mesh sieve and pressed into bars and calcined to form silica-supported catalysts as described in Example 1.

*Example 4*

For the manganese nitrate salts used to form the solution of Examples 1 through 3, there can be substituted stoichiometric equivalent amounts of the following metal salts to obtain similar results:

(1) Nickel formate
(2) Chromium nitrate
(3) Ammonium tungstate
(4) Calcium chloride
(5) Ammonium molybdate
(6) Vanadyl sulfate
(7) Cupric acetate
(8) Cadmium chloride
(9) Zinc nitrate
(10) Mercuric nitrate
(11) Barium acetate
(12) Stannous chloride
(13) Lead nitrate
(14) Bismuth nitrate
(15) Thallium nitrate
(16) Ferric chloride
(17) Cobalt acetate
(18) Cerium sulfate

*Example 5*

A 7-gram quantity of manganese and chromium metals as their nitrate salts, which metals are in the stoichiometric equivalent proportions required to form manganese chromite, is added to 950 milliliters of water at 90° C. The mixture is stirred with a magnetic stirrer until all of the solids are dissolved. The solution is filtered while hot and then cooled and made up to a liter. The solution thus formed contains 7 grams of manganese-chromium metal per liter of water.

A 21.2% silica sol of 100 millimicron particles prepared as described in United States Patent 2,574,902 is deionized as described in Example 1 above. A 135 cubic centimeter portion of the manganese nitrate-chromium nitrate solution described above is added to 467 grams of the silica sol just described, in a Waring blender. The mixture is agitated for one hour, and then 25 grams of the solid polyethylene glycol of Example 1 are added to this mixture and stirred for 15 minutes.

The sol is freeze-dried and the resulting powder is pressed into bars as described in Example 1. These bars are then calcined at 825° C. resulting in a silica-supported manganese chromite catalyst.

*Example 6*

A 6460 gram portion of a 15% silica sol of 7 millimicron average diameter particles as described in United States Patent 2,750,345 is deionized as described in Example 1 above.

A 20.7 cubic centimeter portion of each of the metal salt solutions described in Examples 1 and 4 is added a 323 gram portion of the just described silica sol in a 20 minute period while agitating the sols in a Waring blender. The mixtures are agitated for one hour after the addition of the respective metal solutions. A total of 43 grams of solid polyethylene glycol of Example 1 is then added to each of the mixtures and stirring is continued for 15 minutes. The sols are freeze-dried as described and the resulting powders are pressed into bars as described in Example 1.

Three of the bars resulting from each sample metal-modified silica powder are then calcined at 450° C., 550° C., and 800° C. respectively to produce silica supported metallic catalysts corresponding to the metal modified silica powder precursor.

*Example 7*

A 3.8 gram quantity of calcium metal as its chloride salt is added slowly to 950 milliliters of water at 90° C. The mixture is stirred with a magnetic stirrer until all the solid is dissolved. The solution is filtered while hot and then cooled and made up to a liter. The solution thus formed contains 3.8 grams of calcium per liter of water.

One hundred thirty-five milliliters of the above calcium solution is added to a 320 gram quantity of the deionized silica sol of Example 1 by the same procedures described in Example 1 including the addition of 43 grams of a polyethylene glycol.

The resulting solution is then freeze-dried, pressed into bars, and calcined as described in Example 1 to form a silica-supported calcium catalyst.

*Example 8*

A 20 gram quantity of platinum metal as its chloride salt is added to 900 milliliters of water at 90° C. The mixture is stirred with a magnetic stirrer until all the solid is dissolved. The solution is filtered while hot and then cooled and made up to 1 liter. The solution thus formed contains 20 grams of platinum per liter of water.

One hundred thirty-five milliliters of this platinum solution is added to a 320 gram quantity of the deionized silica sol of Example 1 as there described including the addition of a polyethylene glycol.

The resulting solution is then spray-dried as described in Example 2, then pressed into bars and calcined as described in Example 1 to form a silica-supported platinum catalyst.

*Example 9*

Other precious metal catalysts supported on silica can be made by substituting stoichiometric equivalent amounts of the following metal salts for the platinum chloride of Example 8:

(1) Palladium nitrate
(2) Rhodium chloride
(3) Sodium ruthenate
(4) Iridium chloride
(5) Osmium chloride.

*Example 10*

A 5% by weight silica aquasol containing silica particles of 15 millimicrons average diameter is prepared. The pH of the sol is adjusted to 4.0 by addition of HCl. 600 parts by weight of this sol is rapidly agitated and 65 parts of an aqueous solution containing 3.25 parts of alumina as basic aluminum chloride [$Al_2(OH)_5Cl$] is added to the sol over a period of 30 seconds. The sol is then spray dried to provide fine dry powder which is collected in a cyclone separator, pressed into bars, and calcined as described in Example 1 to form a porous body.

The invention claimed is:

1. A porous, amorphous silica supported metallic catalyst having a density of from 1 to 2 grams per cubic centimeter as determined by mercury displacement and characterized by consisting essentially of: amorphous silica with respect to which there is dispersed substantially homogeneously at least one metal-containing constituent selected from the group consisting of metals and metal oxides, the metal in said constituent being present in the proportion of from 0.01 to 5% by volume based on the silica and being selected from the group consisting of copper, cadmium, manganese, calcium, magnesium, zinc, chromium, aluminum, molybdenum, tungsten, vanadium, cerium, mercury, barium, tin, lead, bismuth, thallium, iron, cobalt, nickel, platinum, palladium, rhodium, ruthenium, iridium, and osmium, the amorphous silica being in the form of ultimate particles in the size range of from 5 to 200 millimicrons, and the pores in the catalyst having such uniformity of size that no more than 5% of the total void volume is present as pores having a size greater than twice the average pore size.

2. The porous, amorphous silica supported metallic catalyst of claim 1 wherein the total content of sodium, potassium and calcium oxides does not exceed about 0.1% by weight.

3. In a process for making a porous, amorphous silica supported metallic catalyst the steps comprising:
  (a) making a silica sol which is substantially free of non-volatile constituents other than silica and in which the silica is amorphous and in the form of non-porous substantially uniformly-sized discrete ultimate particles having an average size in the range of 5 to 200 millimicrons,
  (b) adding to said silica sol at least one metal-containing constituent selected from the group consisting of metals, metal oxides and compounds which decompose to metal oxides on heating to 1000° C. in air, the metal in said constituent being added to said silica sol in an amount of from 0.01 to 5% by volume based on the silica and being selected from the group consisting of copper, cadmium, manganese, calcium, magnesium, zinc, chromium, aluminum, molybdenum, tungsten, vanadium, cerium, mercury, barium, tin, lead, bismuth, thallium, iron, cobalt, nickel, platinum, palladium, rhodium, ruthenium, iridium, and osmium,
  (c) drying the metal-containing sol before any substantial viscosity increase occurs therein and at a rate which is substantially instantaneous after the silica concentration in the continuous liquid sol phase approaches about 50% by weight,
  (d) compacting the powder under pressure to a uniform density of at least 1 gram $SiO_2$ per cubic centimeter, and (e) calcining the compacted material in air at a temperature ranging from about 400 to 850° C.

4. The process of claim 3 in which the drying of the metal-modified silica sol is effected by spray-drying.

5. The process of claim 3 in which the drying of the metal-modified silica is effected by freeze-drying.

6. The process of claim 3 in which the drying of the metal-modified silica is effected by drum-drying.

References Cited by the Examiner

UNITED STATES PATENTS

| | | | |
|---|---|---|---|
| 3,041,140 | 6/1962 | Alexander | 23—182 |
| 3,132,125 | 5/1964 | Schwander et al. | 252—458 X |

OSCAR R. VERTIZ, *Primary Examiner.*

E. J. MEROS, *Assistant Examiner.*